United States Patent [19]

Hartley

[11] Patent Number: 4,816,154
[45] Date of Patent: Mar. 28, 1989

[54] LIQUID FILTERING APPARATUS

[76] Inventor: Philip J. Hartley, 24 Ardoyne House, Pembroke Park, Ballsbridge, Dublin, Ireland

[21] Appl. No.: 19,035

[22] Filed: Feb. 26, 1987

[51] Int. Cl.⁴ .............................................. B01D 29/14
[52] U.S. Cl. ................................. 210/448; 210/497.3
[58] Field of Search ...................... 210/448, 497.3, 499

[56] References Cited

U.S. PATENT DOCUMENTS

| | | | |
|---|---|---|---|
| 979,481 | 12/1910 | Hannold | 210/448 |
| 1,076,128 | 10/1913 | Kupferle | 210/448 |
| 1,901,655 | 3/1933 | Keys | 210/448 |

Primary Examiner—Ivars Cintins
Attorney, Agent, or Firm—Curtis, Morris & Safford

[57] ABSTRACT

A liquid filtering apparatus, especially but not exclusively for cold milk, comprises a substantially cylindrical tubular casing having an inlet at one end for connection to a source of liquid to be filtered and an outlet at the other end for the filtered liquid, and a removable filter sock in the casing having an open end adjacent to the inlet and a closed end remote from the inlet. The internal diameter of the casing along at least a substantial part of the length of the casing is greater than the internal diameter of the casing adjacent to the inlet and the cross-sectional area of the filter sock decreases in the direction from the open end thereof to the closed end.

6 Claims, 2 Drawing Sheets

LIQUID FILTERING APPARATUS

This invention relates to an apparatus for use in filtering a liquid, and in particular but not exclusively to an apparatus for use in filtering milk being transferred from a milk storage tank to a mobile tanker or vice versa.

In the handling of milk whether from a cow byre or a milking parlour, the milk is usually either filtered through a filter disc in the case of a small farmer using a bucket milking system, or, in the case of a larger farmer using a milk pump to transfer the milk from the milking parlour to a refrigerated milk storage tank in the dairy, the milk is passed through a filtering unit employing a filter sock. The present invention is primarily concerned with the latter type of refrigerated milk filtering system.

The conventional filtering units employ filter socks which are woven from cotton or formed from non-woven synthetic fabrics. These types of filter sock are quite effective in retaining heavy organic matter from milk being filtered as warm milk, for example, at a temperature in the range 98° F. to 100° F. (36°–38° C.). However a problem does arise in practice in that not enough farmers use filter sock filtering units and consequently any filtering of the milk between a refrigerated milk storage tank and a mobile milk collection tanker is carried out when the milk is cold, for example 32°–40° F. (0°–5° C.). In use it has been found that cold milk which contains sediment, when filtered, will block up conventional filter socks of woven or non-woven material and the milk flow through the filtering unit is greatly reduced to an unacceptable level.

Using conventional woven or non-woven filter socks in known filtering apparatus using a casing comprising a stainless steel tubular pipe has also been found to create some problems since in many instances one experiences an unacceptable low flow rate of milk through the filtering apparatus. Investigation suggests that in use the filter sock tends to cling to the wall of the tubular pipe impeding flow of milk through the side wall of the filter sock, and collected sediment tends to clog up the bottom (closed) end of the filter sock also impeding flow of milk through the filter sock.

The present invention is directed towards these particular problems in the filtering of cold milk by providing a liquid filtering apparatus comprising a substantially cylindrical tubular casing having an inlet at one end for connection to a source of liquid to be filtered and an outlet at the other end for the filgered liquid, and a removable filter sock in the casing having an open end adjacent to the inlet and a closed end remote from the inlet, in which the internal diameter of the casing along at least a substantial part of the length of the casing is greater than the internal diameter of the casing adjacent to the inlet, and in which the cross-sectional area of the filter sock decreases in the direction from the open end thereof to the closed end.

Preferably, the open end of the filter sock is provided with a ring member to facilitate the location and support of the filter sock within the casing, the ring member engaging a corresponding seating of the inlet. Further the casing is preferably of stainless steel and the filter sock ring member is also preferably stainless steel. The filter sock material is preferably a bolting cloth having a 250 micron rating.

The present invention also provides a filter sock for use with the filtering apparatus, the filter sock having an open end and a closed end and a cross-sectional area which decreases from the open end to the closed end.

The invention will be understood from the following description of an embodiment thereof given by way of example only with reference to the accompanying drawings in which.

Figure 1:
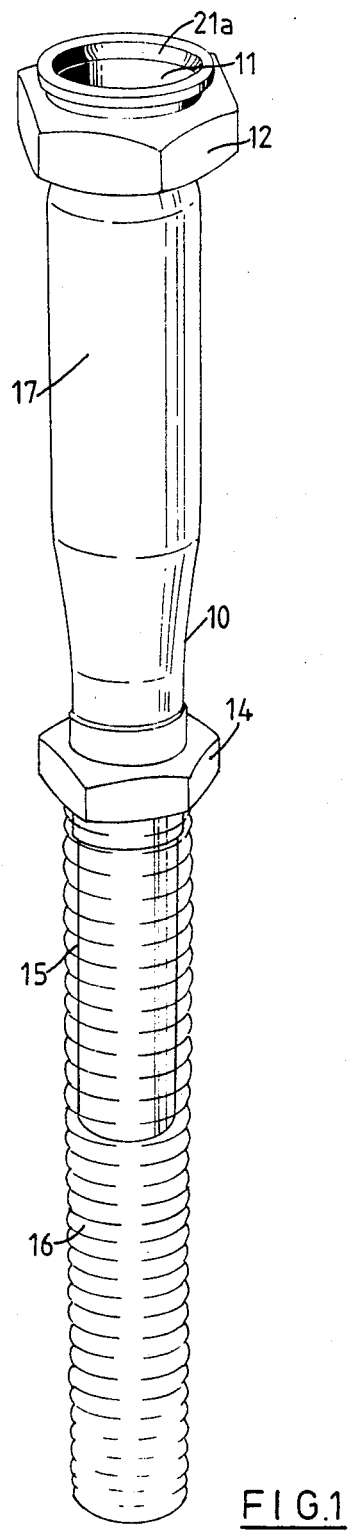
FIG. 1 is a perspective view of the filtering apparatus according to the present invention.
Figure 2:
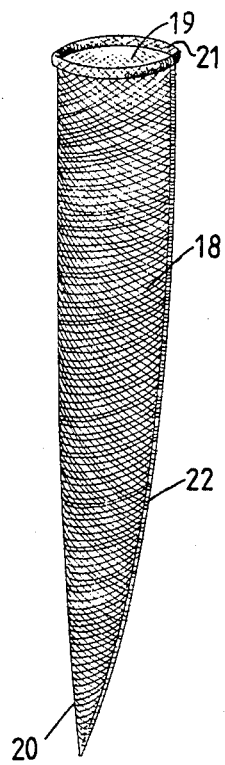
FIG. 2 is a perspective view of a filter sock for use with the filtering apparatus of the present invention.
Figure 3:
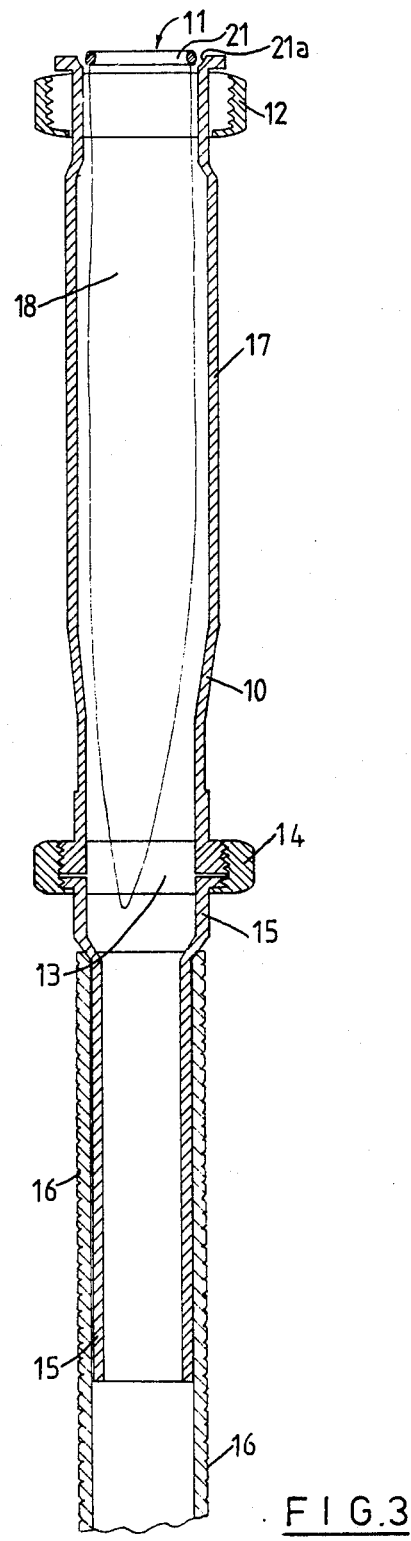
FIG. 3 is a longitudinal cross-sectional view of the filtering apparatus of FIG. 1.

Referring to the drawings, there is shown a liquid filtering apparatus and in particular a filtering apparatus suitable for the efficient filtering of cold milk, i.e. milk at a temperature of approximately 40° F. (5° C.). The filtering apparatus comprises a stainless steel substantially cylindrical tubular casing 10 having an inlet port 11 at one end with a lock-nut 12 for connection of the apparatus to, for example, a pipe outlet from a refrigerated milk storage tank. The casing 10 has an outlet port 13 at the other end, the outlet port 13 also being provided with a lock-nut 14 for connection to, for example, a connection hose to a milk collection mobile tanker, the hose consisting of a stainless steel connection 15 upon which is securely fixed a flexible plastics pipe 16 which connects with the inlet port of the mobile tanker.

Intermediate the inlet port 11 and the outlet port 13 the casing 10 is provided over a substantial part of its length with a "bellied-out" portion 17—namely a length of the casing 10 in which the internal diameter of the casing 10 along the said length of casing is greater than the internal diameter of the casing 10 adjacent the inlet port 11 and, in this example, the outlet port 13.

A removable filter sock 18 is provided in the casing 10, and has an open end 19 adjacent the inlet port 11, and a closed end 20 remote from the inlet port 11. In this example the sock 18 extends for substantially the full length of the casing 10. Along at least a substantial part of its length, and preferably along substantially its full length, the cross-sectional area of the filter sock 18 decreases in the direction from the open end 19 to the closed end to form the apex 20. The open end 19 is provided with a stainless steel ring 21 which ensures that the opening at the end 19 of the filter sock 18 retains a circular open shape. Also, when the filter sock 18 is inserted into the casing 10, the ring 21 engages a seating 21a of the casing inlet port 11, which ensures proper location and support for the filter sock 18 in the casing 10. The filter sock 18 has an overlapping stitch 22 to ensure retention of fine sediment by the filter sock in use.

The shape of the filter sock 18 in combination with the shape of the casing 10 is very important in use. First, the shape ensures that the main body of the filter sock in the bellied-out area 17 of the casing does not in use engage the interior wall of the casing to prevent or reduce milk flow. Second, although sediment will collect in the closed apex 20 of the filter sock, milk flow will not be impaired to any significant extent since the cross-sectional area of the collected sediment in the apex 20 of the filter sock is small compared with the cross-sectional area of the filter sock above said apex 20 and compared with the cross-sectional area of the casing 10. Further, the apex 20 of the filter sock 18 tends to confine the collected sediment so that the milk flow through the filter sock does not tend to cause turbulence of the collected sediment.

It will also be understood that the shape of the filter sock 18 facilitates insertion of the filter sock 18 into the casing 10. The filter sock material is preferably a bolting cloth with a micron rating in the range 560–160 micron—preferably a Swiss nylon with a 250 micron rating.

In operation the filtering apparatus may be used (a) as a filtering apparatus between a refrigerated milk storage tank in a milking parlour of a farm and a mobile milk collection tanker, or (b) between a mobile milk collection tanker and a silo storage tank in a dairy or a creamery. If one considers a milk plant handling 50,000 gallons of milk per day one must envisage 20 mobile tanker deliveries of 2,500 gallons each per day to the milk plant. The milk plant will typically have two discharge bays for the tankers to allow pumping of the milk from the tankers through the filtering apparatus to silo storage tanks. If one allows a flow rate discharge from the tankers to the silo storage tanks of 10,000 gallons per hour to an empty silo and 8,000 gallons per hour to a partially filled silo one will appreciate that no significant reduction in flow rate through the filtering apparatus is acceptable to the plant management.

The filtering apparatus of the present invention has been tested on a milk flow rate of 10,000 gallons per hour for filtering of cold milk (40° F.) and no significant reduction in milk flow rate was experienced.

I claim:

1. An apparatus for filtering milk, comprising an elongated substantially tubular casing formed as a single integral piece having an inlet at one end and an outlet at the other end, first connection means at the inlet for connection of the inlet to a source of milk to be filtered, second connection means at the outlet for connection of the outlet to a receptacle for filtered milk, and an elongated filter sock made of a bolting cloth and removably disposed in the casing and having an open end at the inlet and a closed end remote from the inlet, in which the internal diameter of the casing along at least the major part of the length of the casing occupied by the filter sock is greater than the internal diameter of the casing adjacent to the inlet, and in which the cross-sectional area of the filter sock decreases in the direction from the open end thereof to the closed end.

2. A filtering apparatus according to claim 1, in which the open end of the filter sock comprises a ring member which engages a corresponding seating of the inlet to locate and support the filter sock within the casing.

3. A filtering apparatus according to claim 1 or 2, in which the filter sock extends for substantially the full length of the casing.

4. A filtering apparatus according to claim 2, in which the ring member is of stainless steel.

5. A filtering apparatus according to claim 1, in which the casing is of stainless steel.

6. A filtering apparatus according to claim 1, in which the material of the filter sock has a micron rating in the range 560 to 160 microns.

* * * * *